Feb. 5, 1952     R. HASKINS, JR     2,584,876
GYRO INSTRUMENT

Filed Nov. 29, 1943     2 SHEETS—SHEET 1

INVENTORS:
R. HASKINS, JR.
BY
THEIR ATTORNEY

Feb. 5, 1952 R. HASKINS, JR 2,584,876
GYRO INSTRUMENT
Filed Nov. 29, 1943
2 SHEETS—SHEET 2

INVENTORS:
R. HASKINS, JR.
BY
THEIR ATTORNEY

Patented Feb. 5, 1952

2,584,876

UNITED STATES PATENT OFFICE 2,584,876

GYRO INSTRUMENT

Robert Haskins, Jr., Garden City, N. Y., assignor to The Sperry Corporation, a corporation of Delaware Application November 29, 1943, Serial No. 512,266

14 Claims. (Cl. 74—5.2)

This invention generally relates to improvements in gyroscopic instruments for dirigible craft, such as aircraft.

The primary object of the invention is to prevent the occurrence of a gimbal lock condition in an instrument of this character during acrobatic or unusual maneuvers of a craft.

The term "gimbal lock" in the art is generally employed to cover a critical condition that occurs when a universally gimbaled gyroscope, such as an attitude gyroscope, is approaching and passes through a position in which one of the gimbal axes of the gyro becomes aligned with the spin axis of the gyro rotor. In this position, the gyroscope temporarily loses one of its three degrees of freedom and becomes momentarily unstable, during which time a slight misalignment of the axes usually causes a reversal of the rotor casing in azimuth and a flip-over of the gimbal ring. While most of the disadvantages of this phenomenon can be overcome by so constructing the attitude indications that they are unaffected by either of the above-mentioned happenings, gimbal lock is at best an undesirable phenomenon and it is the object of this invention to avoid this phenomenon entirely.

One of the features of the invention resides in provision of a main and auxiliary gimbal support for the rotor case of the gyroscopic instrument and a means for moving or stabilizing the main gimbal to prevent the auxiliary gimbal from tilting with respect to the rotor case about one of its axes.

A further feature of the invention is provided by the combination pick-off means and servomotor controller for moving the main gimbal of the rotor case of a gyroscopic instrument of this character.

Still another feature of the invention resides in the particular gimbal arrangement and indicating features employed in the improved instrument by which a circular shell is included on the auxiliary gimbal thereof, the shell having pitch and roll indices around the periphery thereof. An instrument of this character as employed on aircraft provides an indication of the instantaneous attitude of the craft in any position about its pitch and roll axes. This attitude indicating instrument is an instrument of the gyro vertical type such as employed in dirigible craft to provide a vertical or horizon reference.

Other objects, features and structural details of the invention will be apparent from the following description when read in relation to the accompanying drawings, wherein.

Figure 1:
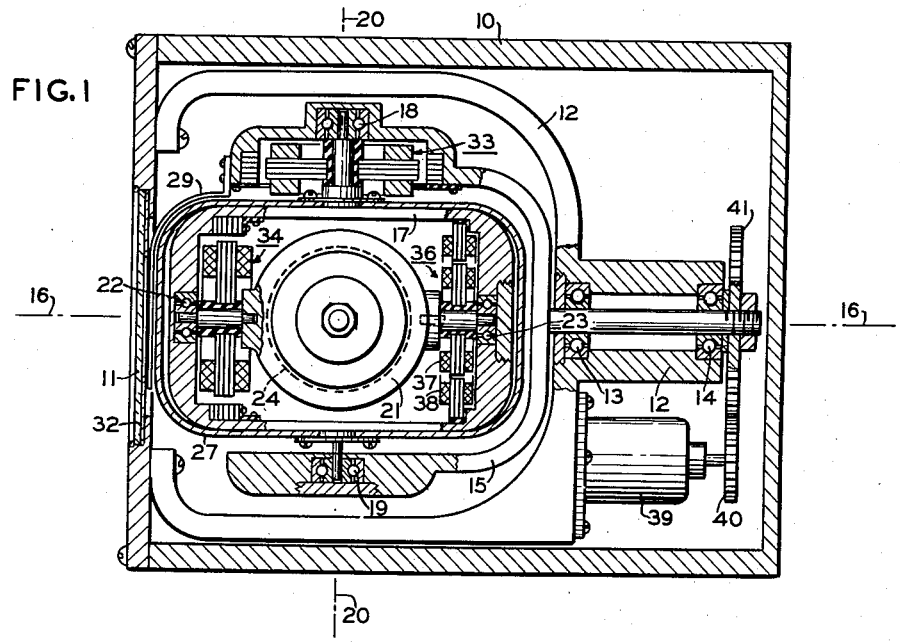
Fig. 1 is a plan view of a gyro instrument constructed in accordance with the teachings of the present invention.
Figure 2:
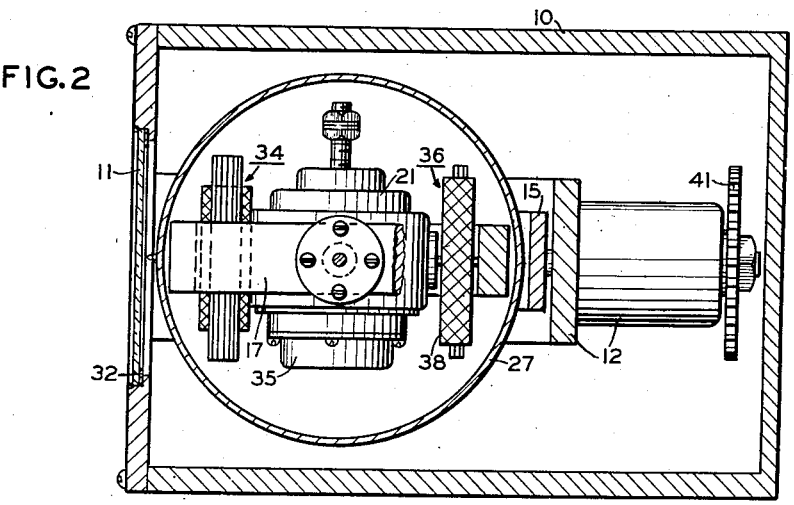
Fig. 2 is a side elevation view of the instrument shown in Fig. 1.

With reference to the drawings, the gyro instrument shown is a vertically mounted gyro vertical of the attitude indicating type primarily adapted for use on aircraft. The casing of the instrument is indicated at 10, the same including a front wall in which a window 11 is provided. Within the casing 10 and suitably fixed thereto is a frame 12 which carries the outer races of spaced bearings 13 and 14. The universal support for the rotor case of the instrument includes a main gimbal 15 which, in the present instance, is U-shaped. Gimbal 15 is mounted within the casing to pivot about the axis defined by the spaced bearings 13, 14 and is arranged with the opening therein adjacent the window 11. The main gimbal axis as designated at 16 is parallel to or coincident with the roll axis of the craft on which the instrument is mounted. Included in the support for the rotor case is an auxiliary gimbal 17 that is pivotally mounted on the main gimbal for movement about an axis perpendicular to the axis 16 by means of spaced bearings 18 and 19. The axis 20 of the auxiliary gimbal is normally parallel to or coincident with the pitch axis of the aircraft.

The rotor case of the instrument is indicated at 21, the same being pivotally mounted on the auxiliary gimbal 17 by means of bearings 22 and 23 for movement about an axis perpendicular to the axis 20. In the normal position of the parts of the gyro instrument, the axis of the rotor case on the auxiliary gimbal 17 is coincident with the axis 16 of the main gimbal 15. A conventional gyro rotor 24 is mounted in the case 21 for spinning about a normally vertical axis. The rotor 24 may be spun electrically by a suitable motor as schematically indicated at 25 in Fig. 4, the windings of the motor being energized from a suitable source of electrical energy as designated at 26.

Figure 3:
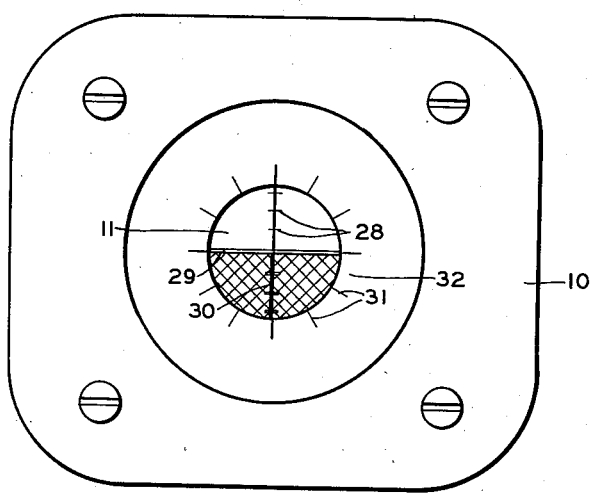
Fig. 3 is a front elevation view showing the face of the instrument illustrated in Figs. 1 and 2.

In the attitude indicating instrument shown, a circular shell 27 is fixed in position on the auxiliary gimbal with the axis of symmetry thereof coincident with the axis 20 of the auxiliary gimbal. The periphery of the shell is graduated to include pitch attitude indices 28 thereon which are observed through the window 11 by the pilot in connection with the fixed reference bar 29, one end of which is suitably connected to the main gimbal 15. Observation of the attitude of the craft with reference to its roll axis or axis 16 of the instrument is provided by the meridian line 30 on the periphery of the shell 27 in connection with the circular scale 31, Fig. 3, that may be located on a mask 32 situated to the rear of the window 11. Mask 32 is fixed relative to the casing 10.

Conventional torque motors as designated at 33 and 34 are employed to normally erect the rotor case and maintain the spin axis of the rotor therein vertical, motor 33 exerting a torque about axis 20 to precess the case about the axis thereof defined by bearings 22, 23 on the auxiliary gimbal. Similarly, motor 34 exerts a torque about the axis of the rotor case defined by bearing 22, 23 to precess the auxiliary gimbal and the case about axis 20. These motors may be controlled by a liquid level switch as generally indicated at 35 which is fixed to the rotor case.

Figure 4:
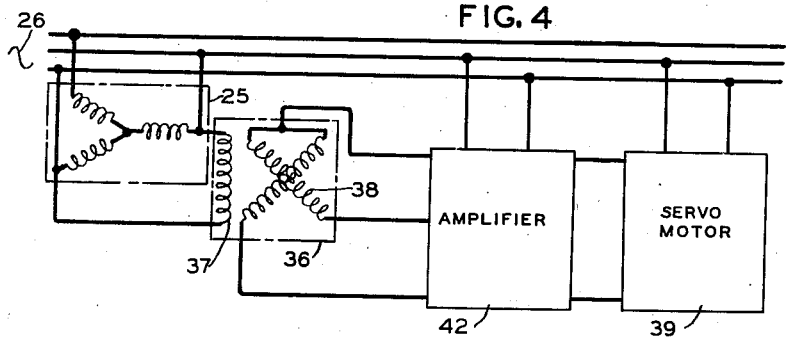
Fig. 4 is a circuit diagram showing the electrical connections of the pick-off and the servomotor employed in the improved gyro instrument.

In accordance with the teaching of the present invention, means in the form of a pick-off is provided for detecting relative tilt of the auxiliary gimbal 17 and the gyro casing 21 about the axis defined by bearings 22, 23. The pick-off shown as indicated generally at 36 may be a signal generator of the "Selsyn" type, one part of which may be fixed to the auxiliary gimbal and the other part of which may be positioned by the rotor case 21. In the present instance, the single phase rotor 37 of the electrical pick-off provided is fixed to one of the trunnions extending from the rotor case, and the polyphase stator 38 thereof is secured in position on the auxiliary gimbal 17. When the case is tilt free about its axis relative to the auxiliary gimbal, the pick-off has a null output. As shown in Fig. 4, the rotor winding of the pick-off is energized from source 26, the same being responsive to tilt about the axis defined by bearings 22, 23 of the case of the instrument to produce an output that is utilized to control a means for moving the main gimbal. In the drawing, the moving means employed is a servomotor 39 of conventional form that drives or turns the main gimbal by way of meshed pinions 40 and 41. The reversible motor 39 operates, in response to the output of the pick-off 36, whose output may be fed to the motor by way of an amplifier 42, to cause movement of the main gimbal 15 in a direction that restores the rotor case to a tilt-free condition relative to the auxiliary gimbal or about the axis defined by bearings 22, 23.

During acrobatic movements of the craft when the case axis defined by the bearings 22, 23 is not coincident with axis 16, the auxiliary ring supports the rotor case on mutually perpendicular axes at any position of the main gimbal. If tilt of the rotor case occurs relative to the auxiliary gimbal about the axis defined by bearings 22, 23, the pick-off is rendered effective to move the main gimbal in a direction that restores the auxiliary gimbal to a tilt-free condition relative to the axis defined by bearings 22, 23. This prevents the trunnions 18—19 of auxiliary gimbal 17 from tilting about the axis defined by bearings 22, 23 to a position in which the trunnions 18—19 would be coincident with the spin axis of the rotor and thus eliminates the occurrence of a gimbal lock condition in a device of this character. It will be clear from the drawings that when the axis 16 of the main gimbal 15 is coincident with the spin axis of the rotor 24, (as during a vertical dive) the rotor case is then universally supported in the auxiliary gimbal 17 about axis 20 and the axis defined by the bearings 22, 23. Consequently, the only position of the case in which gimbal lock can occur in the instrument is one in which the spin axis of the rotor is coincident with axis 20, but this cannot occur because the spin axis and the axis 20 of the instrument are maintained in perpendicular relation by means of the pick-off and servomotor control of the main gimbal in accordance with the teaching of the present invention so that a gimbal lock condition is positively prevented.

Relative to the craft, the pitch axis of the instrument is axis 20. Similarly, the instrument has two normally coincident roll axes, the first of which is provided by axis 16 and the second of which is provided by the axis defined by bearings 22, 23. The pick-off functions as a means for detecting tilt about the second roll axis of the instrument, such means operating to render the normally ineffective reversible motor 39 effective. Servomotor 39 moves the mounting for the instrument about the second roll axis in a direction that restores trunnion axis 18—19 constituting the outer gimbal axis of the rotor case to a tilt-free condition about its second roll axis.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyro vertical having a rotor case, a universal support for the rotor case including a main gimbal and an auxiliary gimbal mounted on said main gimbal for movement about an axis perpendicular to the axis of the main gimbal, said case being pivotally mounted on the auxiliary gimbal on an axis that is normally coincident with the axis of the main gimbal, a normally ineffective, two part, electrical pick-off, one of whose parts is positioned by the rotor case and the other of whose parts is located on the auxiliary gimbal, and servomotive means operable to move said main gimbal about its axis responsive to the output of said pick-off upon tilt of the rotor case about its axis relative to the auxiliary gimbal.

2. A gyro vertical for dirigible craft having a casing, a main gimbal mounted therein for movement about a first roll axis relative to the craft, an auxiliary gimbal mounted on said main gimbal for movement about a pitch axis relative to the craft, a gyro rotor case pivotally mounted on said auxiliary ring for movement about a second roll axis relative to the craft, means for detecting tilt of the case about its second roll axis, and means controlled by said detecting means for moving said main gimbal to prevent the occurrence of a gimbal lock condition in the instrument.

3. A gyro vertical as claimed in claim 2, in which the detecting means is an electrical pick-off and the moving means is a reversible motor.

4. An attitude gyro instrument for aircraft having a casing with a window in the front wall therof, a U-shaped main gimbal mounted therein with the opening in the gimbal adjacent the window, an auxiliary gimbal mounted on said main gimbal for movement about an axis perpendicular to the axis of the main gimbal, a circular shell, fixed in position on the auxiliary gimbal with the axis of symmetry thereof coincident with the axis of the auxiliary gimbal, having pitch and roll indices around the periphery thereof, and a gyro rotor case pivotally mounted on said auxiliary gimbal for movement about an axis perpendicular to the axis of the auxiliary gimbal.

5. An instrument as claimed in claim 4 which includes normally ineffective means for moving said main gimbal about its axis, and means for rendering said moving means effective including a two part, tilt detecting pick-off, one of whose parts is positioned by the rotor case and the other of whose parts is mounted on the auxiliary gimbal.

6. In an attitude gyro instrument for aircraft, a casing having a window in the front wall thereof, a rotor case universal support including a U-shaped main gimbal journalled in said casing on a first normally horizontal axis with its opening adjacent the window, an auxiliary gimbal mounted in said main gimbal for movement about a second normally horizontal axis perpendicular to the axis of the main gimbal, said rotor case being pivoted in said auxiliary gimbal on an axis normally in line with said first axis, and a shell fixed to the auxiliary gimbal with the axis of symmetry thereof coincident with the axis of the auxiliary gimbal, having pitch and roll indices around the periphery thereof.

7. A gyro attitude instrument for aircraft having a casing adapted to be fixed on the craft, a main gimbal journaled therein on a fore and aft axis, an auxiliary gimbal mounted on said main gimbal for movement about an axis perpendicular to said first axis and normally transverse, a gyro rotor case pivotally mounted on said auxiliary gimbal for movement about an axis perpendicular to the axis of the auxiliary gimbal and normally fore and aft, a two-part pick-off means for detecting tilt of the case about its axis relative to the auxiliary gimbal having a part fixed to the case and a part fixed to the auxiliary gimbal and means responsive to said pick-off means for moving said main gimbal about its axis in a direction that maintains the auxiliary gimbal in a tilt-free condition relative to the case.

8. A gyro attitude instrument for aircraft having a casing adapted to be fixed on the craft, a main gimbal journaled therein on a fore and aft axis, means for turning said main gimbal about its axis, an auxiliary gimbal mounted on said main gimbal for movement about a normally transverse axis, a gyro rotor case pivotally mounted in said auxiliary gimbal for movement about an axis perpendicular to the axis of the auxiliary gimbal, and a signal pick-off having a part fixed to the case and a part fixed to the auxiliary gimbal operable to control said turning means and thereby prevent the occurrence of a gimbal lock condition in the instrument.

9. A gyro attitude instrument for aircraft having a casing adapted to be fixed on the craft, a main U-shaped gimbal journaled therein on a fore and aft axis, means for turning said main gimbal about its axis, an auxiliary gimbal mounted on said main gimbal for movement about a normally transverse axis, a gyro rotor case pivotally mounted in said auxiliary gimbal for movement about an axis perpendicular to the axis of the auxiliary gimbal, a signal pick-off having a part fixed to the case and a part fixed to the auxiliary gimbal, operable to control said turning means and thereby prevent the occurrence of a gimbal lock condition in the instrument, and attitude indicia stabilized by said rotor case and visible through the open side of said U-shaped gimbal.

10. A gyro instrument having a casing, a rotor case universally supported therein on main and auxiliary gimbals whose axes are mutually perpendicular, the rotor case being pivotally mounted on the auxiliary gimbal on an axis that is normally coincident with the axis of the main gimbal, two-part signal means for detecting tilt of the rotor case about its axis relative to the auxiliary gimbal having a part fixed to the case and a part fixed to said auxiliary gimbal, and a motor mounted in said casing and connected to said main gimbal which is responsive to said detecting means for moving said main gimbal, and with it said auxiliary gimbal, about the axis of the main gimbal to prevent the occurrence of a gimbal lock condition in the instrument.

11. In an attitude gyro instrument for aircraft, a casing having a window in the front wall thereof, a rotor case universal support including a U-shaped main gimbal journaled in said casing about a first axis with its open end adjacent the window, an auxiliary gimbal mounted in said main gimbal for movement about a second axis perpendicular to the axis of the main gimbal, a rotor case journaled in said auxiliary gimbal about an axis normally in line with said first axis, means for detecting tilt of the rotor case and said auxiliary gimbal about said third axis, means responsive to said detecting means for moving said main gimbal to prevent such tilt, and a shell fixed to the auxiliary gimbal with the axes of symmetry thereof coincident with the aforesaid axes and having pitch and roll indices on the periphery thereof.

12. An attitude gyro instrument for aircraft having a casing with a window in the front wall thereof, a U-shaped main gimbal journaled therein about a first axis with the opening in the gimbal adjacent the window, an auxiliary gimbal journaled in said main gimbal for movement about a second axis perpendicular to the first axis, a circular shell fixed in position on the auxiliary gimbal with the axis of symmetry thereof coincident with said second axis, and having pitch and roll indices around the periphery thereof, and a gyro rotor case pivotally mounted in said auxiliary gimbal within said shell for movement about an axis perpendicular to the axis of the auxiliary gimbal.

13. In an attitude gyro instrument for aircraft, a casing having a window in the front wall thereof, a universal support including a U-shaped main gimbal mounting in said casing with its opening adjacent the window, an auxiliary gimbal mounted on said main gimbal for movement about an axis perpendicular to the axis of the main gimbal, a shell fixed to the auxiliary gimbal with the axis of symmetry thereof coincident with the axis of the auxiliary gimbal, having pitch and roll indices around the periphery thereof, a rotor case pivotally mounted in said auxiliary gimbal within said shell, and means for stabilizing said gimbal from said case.

14. In an attitude gyro for aircraft, a casing having a window in the front wall thereof, a reference index at said window, a rotor bearing frame, a universal support for said frame in said casing including a U-shaped main gimbal ring journaled in said casing on a fore and aft axis to the rear of said opening and with said opening adjacent said window, an auxiliary gimbal journaled in said main gimbal about a normally horizontal transverse axis, said auxiliary gimbal journaling said frame on a third axis normally coincident with said fore and aft axis, a circular shell fixed to said auxiliary gimbal, said shell being symmetrical about both said transverse axis and said third axis and said shell having indications thereon showing both up and down pitch and lateral tilt with respect to said reference index, and motive means responsive to the position of said gyro frame about said third axis for maintaining the athwartship axis of said auxiliary gimbal horizontal.

ROBERT HASKINS, Jr.

REFERENCES CITED

The following references are of record in the file of this patent:

UNITED STATES PATENTS

| Number | Name | Date |
| --- | --- | --- |
| 1,324,128 | Meitner | Dec. 8, 1919 |
| 2,200,196 | Von Manteuffel | May 7, 1940 |
| 2,293,039 | Esval | Aug. 18, 1942 |